United States Patent [19]
Cornellier

[11] 3,911,761
[45] Oct. 14, 1975

[54] FUNCTION LOCK DETENT STABILIZER

[75] Inventor: Raymond J. Cornellier, Westland, Mich.

[73] Assignee: Burroughs Corporation, Detroit, Mich.

[22] Filed: Sept. 30, 1974

[21] Appl. No.: 510,796

[52] U.S. Cl..................... 74/527; 74/567; 70/379 R; 200/291; 200/153 LB
[51] Int. Cl.[2] ...................... G05G 05/06; F16H 53/00; E05B 09/10; H01H 03/00
[58] Field of Search............ 74/527, 567; 70/379 R, 70/380; 200/291, 288, 44, 153 LB

[56] References Cited
UNITED STATES PATENTS

| | | | |
|---|---|---|---|
| 1,828,562 | 10/1931 | Gilpin | 200/44 |
| 2,794,103 | 5/1957 | Moore et al. | 74/567 X |
| 3,602,245 | 8/1971 | Meisel | 74/527 X |
| 3,739,612 | 6/1973 | Schultz | 70/380 |
| 3,826,156 | 7/1974 | Dornaus | 74/527 |

Primary Examiner—Samuel Scott
Assistant Examiner—P. S. Lall
Attorney, Agent, or Firm—Edwin W. Uren; Paul W. Fish

[57] ABSTRACT

A function selecting rotatable and variously positionable multiple-surfaced control cam in the control panel of a data processing unit is provided with a quadrangular recess formed in a journal end thereof, and the offset extremities of an anchored V-shaped spring cooperate wtih the cornor angles and the side walls of the recess to define the various selectable angular positions of the cam and to prevent the inadvertent rotation of the cam away from the defined selected positions.

22 Claims, 9 Drawing Figures

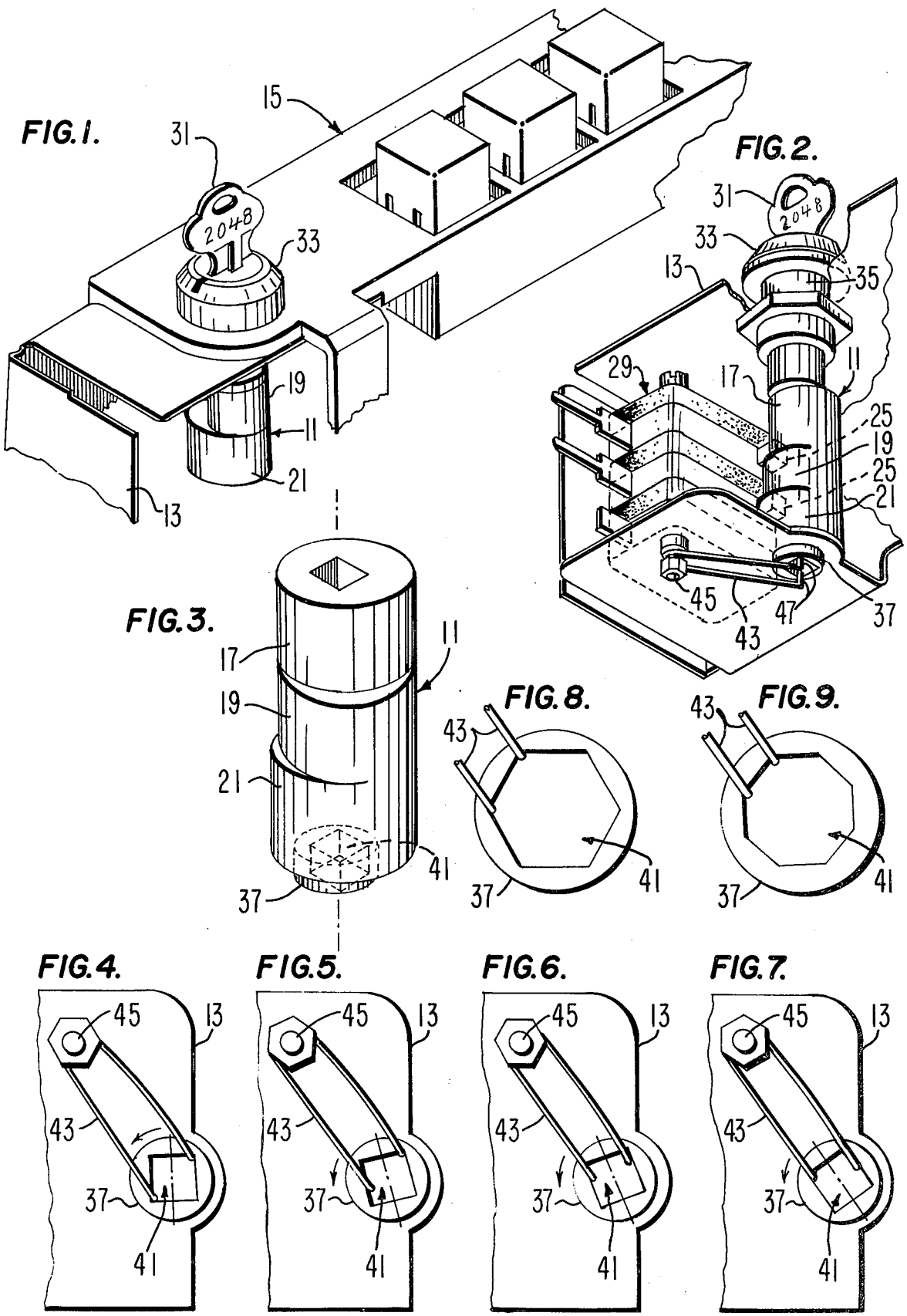

FUNCTION LOCK DETENT STABILIZER

BACKGROUND OF THE INVENTION

A chronic problem in the data processing art is the tendency of positionable function selectors in related control devices to vibrationally drift from their pre-set selected positions, with the consequent result that the controlled unit either misoperates or interrupts the performance of the overall system. Typical of this problem is the tendency of function selectors in the control panel of a terminal unit to drift away from their selected pre-set positions, and particularly the tendency of mode-control key lock devices to deviate from their pre-set positions as a consequence of the normal vibrations that characterize the operation of the equipment. An example of the pre-set mode-control positions from which or as between which a key lock assembly in a control device might drift would be positions defining an "off" mode, an "off-line" mode, and an "on-line" mode of operation of the unit.

Similar problems have been known to exist also in the mechanical arts where a variety of function producing linkages are selectively indexable by an angularly positionable control cam, and where the vibrations generated by operation of the equipment cause the control cam to deviate from its preselected position.

SUMMARY OF THE INVENTION

It is accordingly an object of the present invention to provide means associated with an angularly positionable control cam that is effective for defining the selectable positions thereof.

It is another object of the present invention to provide means associated with an angularly positionable control cam that is effective to resiliently resist deviation of the cam away from its preselected position.

It is still a further object of the present invention to provide a rotatable function selecting control cam with a detent-type resilient stabilizer such that the preselected positions thereof may be maintained during the operation of the controlled equipment.

It is yet an additional object of the present invention to render the key lock mode-control devices of a terminal unit virtually immune to the normal vibrations that are produced by operation of the unit.

An important aspect of the invention is the adaptation of a journal end of an angularly positionable control cam to include a multi-sided and symmetrical recess, and the superposing of the offset extensions of an anchored V-shaped spring within the recess such that the extensions of the spring resiliently cooperate with the side walls and corner angles of the recess, to thereby both define the selectable angular positions of the cam and to effectively resist movement of the cam away from the defined selected positions.

BRIEF DESCRIPTION OF THE DRAWING

These and other objects and advantages of the invention will be more clearly understood from the following description when read in conjunction with the accompanying drawing figures, in which:

FIG. 1 is a perspective fragmentary view of a typical control panel for a data processing terminal unit in which a typical key lock control device is illustrated;

FIG. 2 is a fragmentary perspective and elevational view of the control panel of FIG. 1 in which the detailed structure of the key lock control device is illustrated;

FIG. 3 is a perspective elevational view of the control cam shown in FIG. 2 and wherein the various camming surfaces of the cam are more clearly illustrated;

FIG. 4 is a fragmentary bottom view of the inventive device as shown in FIG. 2, the arrangement of the various elements defining a selectable angular position of the control cam of FIGS. 2 and 3;

FIG. 5 is a view similar to FIG. 4 and showing the relative positions of the elements as they would appear during an early stage of transition as between two selectable angular positions of the cam;

FIG. 6 is a view similar to FIGS. 4 and 5 and showing the relative positions of the elements as they would appear during a subsequent stage of the transition between two selectable angular positions of the cam;

FIG. 7 is a view similar to FIGS. 4, 5 and 6 and showing the relative positions of the elements as they would appear during a still later stage of the transition between selectable angular positions of the cam, such stage immediately preceding completion of the transition and definition of a new selectable angular position as represented in FIG. 4;

FIG. 8 is a view similar to FIG. 4 but wherein a hexagonally rather than a quadrangularly configured recess is employed; and FIG. 9 is a view similar to FIG. 8 but wherein an octagonally configured recess is employed.

DESCRIPTION OF THE PREFERRED EMBODIMENT

In the environment of a terminal unit for a data processing system, the control cam forming part of the present invention may take the form of the cam 11 shown in FIGS. 1, 2 and 3, such cam being rotatably mounted within the frame structure 13 of a control panel generally designated at 15. The typical control cam 11 may be comprised of a first camming surface 17, second camming surface 19 and third camming surface 21 as illustrated in FIGS. 2 and 3, each of the camming surfaces providing cooperation with an individual switch actuator 25 of a plurality of switches generally designated at 29 in FIG. 2, whenever the cam 11 is presettably rotated by an operator to select a desired mode of operation of the unit. For the purpose of selecting the desired mode-control position of the cam 11, the operator, for example, might insert a key 31 into the key lock 33 and rotate the key to the desired mode-control position, as designated by suitable indicia on the face of the panel. As is suggested by FIG. 2, the cam assembly 11 is rotatably mounted in the frame structure 13 by means of an upper journal member 35 and a lower journal member 37, the lower member 37 extending through and beyond the frame structure 13 as best illustrated in FIG. 2. Positioning of the key 31 in its horizontal and full counterclockwise rotated position, for example, might serve to pre-set the terminal unit to its inoperative or "off" condition, and clockwise rotation of the key 31 from its "off" position to either a central vertical or horizontal full clockwise rotated position might serve to pre-set the terminal unit to either an off-line or an on-line operating condition.

As illustrated in FIGS. 4–9, the inventive function lock stabilizer is comprised of a multi-sided and symmetrical recess, generally designated at 41, which is formed in the lower journal member 37 of the cam 11, and a V-shaped spring 43 having its vertex anchored to the frame structure 13 by any suitable means such as the nut and bolt combination designated at 45. The spring 43 is provided with offset terminal extensions 47 that are superposed within the recess 41, and with a normal set of substantially greater width than the maximum diameter of the recess 41 as represented, for example, by opposing corner angles of the quadrangularly configured recess illustrated in FIG. 4, such arrangement assuring cammable cooperation as between the offset extensions 47 of the spring and the side walls and corner angles of the recess.

The preferred embodiment of the inventive function lock stabilizer provides a recess 41 of quadrangular configuration as illustrated in FIGS. 2 and 4–7, such configuration providing the key 31 and cam 11 with a maximum of four selectable angular positions, whereas the embodiments of FIGS. 8 and 9 provide a recess 41 of hexagonal and octagonal configurations, respectively, to thereby provide a maximum of six and eight selectable angular positions, respectively.

The operation of the preferred embodiment of the invention may best be understood with reference to FIGS. 4–7 wherein various relationships as between the offset extensions 47 and the side walls and corner angles of the recess 41 are illustrated. FIG. 4 illustrates the relationship of the offset extensions 47 and the corner angles of the recess 41 when the key 31 is precisely located in a selectable function-controlling position, it being noted that in FIG. 4 the offset extensions 47 are cammably disposed relative to opposite corner angles of the recess, such relationship serving to precisely define a function-controlling position of the key 31 and a selectable angular position of the cam 11. As the key 31 is rotated clockwise in the direction of the adjacent function-controlling position (counterclockwise with respect to the lower journal member 37 as viewed in FIGS. 4–9), the leftmost offset terminal extension 47 of the spring 43 is cammably displaced from the lower left corner angle of the recess 41 to assume a position substantially midway of the adjacent side wall of the recess, as illustrated in FIG. 5. With the additional counterclockwise movement of the cam 11 and lower journal member 37, the rightmost offset terminal extension 47 of the spring 43 is cammably displaced from the upper right corner angle of the recess 41 to assume a position relative to the rightwardly adjacent side wall of the recess contiguous to the corner angle from which displaced, the leftmost offset extension 47 being concurrently displaced from its midway position relative to the left side wall to a position substantially contiguous to the upper left corner angle with the leftmost and rightmost offset extensions 47 assuming a substantially parallel relationship relative to the upper side wall of the recess as illustrated in FIG. 6. With the additional counterclockwise movement of the cam 11 and journal member 37, the leftmost offset extension 47 assumes a cammable relationship relative to the approaching upper left corner angle of the recess and the rightmost offset extension 47 assumes a position substantially midway of the upper right side wall, as illustrated in FIG. 7. The adjacent function-controlling position of the key 31 and cam 11 is thereafter defined and retainably located when with the slight additional counterclockwise rotation of the cam 11 and lower journal member 37 the rightmost offset extension 47 of the spring 43 assumes a cammable relationship relative to the advancing lower right corner angle of the recess, the leftmost and rightmost offset extensions 47 of the spring 43 in cammable cooperation with the corner angles of the recess 41 serving to detentably define the newly selected function-controlling position of the key 31 and the selectable angular position of the cam 11, and to resiliently resist displacement of the cam 11 from its said defined position, as again illustrated in FIG. 4.

In the embodiments of FIGS. 8 and 9, wherein a maximum of six or eight function-controlling positions of the key 31 and cam 11 may be provided, respectively, a selected function-controlling position of the key 31 and selectable angular position of the cam 11 are defined by the cammable cooperation of the offset extensions 47 with adjacent pairs of corner angles of the recess 41. In such case clockwise rotation of the key 31 and cam 11 (counterclockwise rotation of the lower journal member 37 as viewed in FIGS. 8 and 9) results in the initial displacement of the rightmost offset extension 47 from the rightmost of the engaged adjacent corner angles, to assume a position substantially midway of the rightwardly adjacent side wall, with continued rotation of the cam 11 and lower journal member 37 resulting in the displacement of the leftmost offset extension 47 from the leftmost of the engaged adjacent corner angles and the cammable engagement of both the rightmost and leftmost offset extensions 47 with the approaching pair of adjacent corner angles, the newly selected function-controlling position of the key 31 and the selectable angular position of the cam 11 being detentably defined by the offset extensions 47 as again illustrated in FIGS. 8 and 9.

Whereas several embodiments of the inventive function lock detent stabilizer have been described in considerable detail, it will be apparent that various changes and modifications in the structural arrangement of the invention may be made by those skilled in the art without departing from the true spirit and scope of the invention.

What is claimed is:

1. Improved function selecting means for use in a control panel of a data processing unit to actuate selected ones of a plurality of function switches, said means comprising:

a. a rotatable cam journally mounted in the frame structure of said panel and having a plurality of cam surfaces disposed along the periphery thereof,
   b. means associated with a first journaled extremity of said cam for rotatably activating said cam such that selected cam surfaces thereof are activated into cooperating relationship with associated switch actuators of said plurality of switches,
   c. a multi-sided and symmetrically recess formed in a second journaled extremity of said cam opposite said first extremity, adjacent sides of said recess presenting corner angles thereof representing selectable angular positions of said cam, and
   d. a V-shaped spring fixed at its vertex to said frame structure and disposed in a plane parallelling the cross-sectional plane of said recess, said spring having a pair of offset extensions superposed within said recess and cooperating with the side and corner angles thereof, whereby upon activating said rotatably activating means to selectively alter the angular position of said cam, said pair of offset extensions alternately and cammably cooperate initially with the approaching sides of said recess and thereafter cammably and detentably cooperate with the approaching corner angles thereof to locatably define a selected angular position of said cam and to resiliently resist movement of said cam away from said defined selected position.

2. The improved function selecting means defined in claim 1 wherein said means for rotatably activating said cam is a position selecting key and key lock combination effective for conditioning the data processing unit to operate in a selected one of a plurality of predetermined modes.

3. The improved function selecting means defined in claim 1 wherein said V-shaped spring is provided with a normal set affording a spaced apart distance between its said pair of offset extensions that is in excess of the maximum diameter of said recess formed in said second journaled extremity of said cam.

4. The improved function selecting means defined in claim 1 wherein said multi-sided and symmetrical recess is quadrangular in configuration and said cam is provided with a maximum of four cam surfaces to thereby afford selectable activation with a maximum of four function switches.

5. The improved function selecting means defined in claim 1 wherein said multi-sided and symmetrical recess is hexagonal in configuration and said cam is provided with a maximum of six cam surfaces to thereby afford selectable activation with a maximum of six function switches.

6. The improved function selecting means defined in claim 1 wherein said multi-sided and symmetrical recess is octagonal in configuration and said cam is provided with a maximum of eight cam surfaces to thereby afford selectable activation with a maximum of eight function switches.

7. Improved function selecting means for use in a control device for mechanical apparatus whereby a plurality of function linkages may be indexed and selectably activated, said means comprising:
   a. a rotatable cam journally mounted in the frame structure of said control device and having a plurality of cam surfaces disposed along the periphery thereof, each of said cam surfaces in cooperation with said function linkages being capable of producing at least one function by means of said mechanical apparatus,
   b. means associated with a first journaled extremity of said cam for rotatably activating said cam such that selected cam surfaces thereof are activated into cooperating relationship with said selected ones of said function linkages,
   c. a multi-sided and symmetrical recess formed in a second journaled extremity of said cam opposite said first extremity, adjacent sides of said recess presenting corner angles thereof representing selectable angular positions of said cam, and
   d. a V-shaped spring fixed at its vertex to said frame structure and disposed in a plane parallelling the cross-sectional plane of said recess, said spring having a pair of offset extensions superposed within said recess and cooperating with the sides and corner angles thereof, whereby upon activating said rotatably activating means to selectively alter the angular position of said cam said pair of offset extensions alternately and cammably cooperate initially with the approaching sides of said recess and thereafter cammably and detentably cooperate with the approaching corner angles thereof to locatably define a selected angular position of said cam and to resiliently resist movement of said cam away from said defined selected position.

8. The function selecting means defined in claim 7 wherein said means for rotatably activating said cam is a position selecting key and key lock combination effective for indexing the function linkages such that a selected function of the mechanical apparatus is performed.

9. The function selecting means defined in claim 7 wherein said V-shaped spring is provided with a normal set affording a spaced apart distance between its said pair of offset extensions that is in excess of the maximum diameter of said recess formed in said second journaled extremity of said cam.

10. The function selecting means defined in claim 7 wherein said multi-sided and symmetrical recess is quadrangular in configuration and said cam is provided with a maximum of four cam surfaces for selectably indexing said plurality of function linkages.

11. The function selecting means defined in claim 7 wherein said multi-sided and symmetrical recess is hexagonal in configuration and said cam is provided with a maximum of six cam surfaces for selectably indexing said plurality of function linkages.

12. The function selecting means defined in claim 7 wherein said multi-sided and symmetrical recess is octagonal in configuration and said cam is provided with a maximum of eight cam surfaces for selectably indexing said plurality of function linkages.

13. Improved means for defining the selectable angular positions of a rotatably journaled multiple surfaced function cam and for resiliently resisting the rotatable movement of said cam away from said selected angular positions, said means comprising:
   a. a multi-sided and symmetrical recess formed in a journaled extremity of the cam, adjacent sides of said recess presenting corner angles thereof representing selectable angular positions of said cam, and
   b. a V-shaped spring fixed at its vertex and disposed in a plane parallelling the cross-sectional plane of said recess, said spring having a pair of offset extensions superposed within said recess and cooperating with the sides and corner angles thereof, whereby upon the selectable rotation of said cam to selectably alter the angular position of the cam said pair of offset extensions alternately and cammably cooperate initially with the approaching sides of said recess and thereafter cammably and detentably cooperate with the approaching corner angles thereof to locatably define a selected angular position of said cam and to resiliently resist movement of the cam away from said defined selected position.

14. The improved means defined in claim 13 wherein said V-shaped spring is provided with a normal set affording a spaced apart distance between its said pair of offset extensions that is in excess of the maximum diameter of said recess formed in said journaled extremity of said cam.

15. The improved means defined in claim 13 wherein said multi-sided and symmetrical recess is quadrangular in configuration and said cam is provided with a maximum of four cam surfaces.

16. The improved means defined in claim 13 wherein said multi-sided and symmetrical recess is hexagonal in configuration and said cam is provided with a maximum of six cam surfaces.

17. The improved means defined in claim 13 wherein said multi-sided and symmetrical recess is octagonal in configuration and said cam is provided with a maximum of eight cam surfaces.

18. Improved adjusting means for use in association with a multiple function device and effective for adjustably selecting individual ones of said multiple functions, said means comprising:
   a. a rotatably journaled function cam having a plurality of cam surfaces disposed along the periphery thereof, each of said cam surfaces being capable of producing at least one of said multiple functions,
   b. a multi-sided and symmetrical recess formed in a journaled extremity of said cam, adjacent sides of said recess presenting corner angles thereof locatably representing selectable functions of said multiple function device that are rendered operative by the selectable angular positioning of said cam, and
   c. a V-shaped spring fixed at its vertex and disposed in a plane parallelling the cross-sectional plane of said recess, said spring having a pair of offset extensions superposed within said recess and cooperating with the sides and corner angles thereof, whereby upon the selectable rotation of said cam to render a selected function operative said pair of offset extensions alternately and cammably cooperate initially with the approaching sides of said recess and thereafter cammably and detentably cooperate with the approaching corner angles thereof to locatably define a function selecting angular position of said cam and to resiliently resist movement of the cam away from said defined position.

19. The improved adjusting means defined in claim 18 wherein said V-shaped spring is provided with a normal set affording a spaced apart distance between its said pair of offset extensions that is in excess of the maximum diameter of said recess formed in said journaled extremity.

20. The improved adjusting means defined in claim 18 wherein said multi-sided and symmetrical recess is quadrangular in configuration and said cam is provided with a maximum of four function producing cam surfaces.

21. The improved adjusting means defined in claim 18 wherein said multi-sided and symmetrical recess is hexagonal in configuration and said cam is provided with a maximum of six function producing cam surfaces.

22. The improved adjusting means defined in claim 18 wherein said multi-sided and symmetrical recess is octagonal in configuration and said cam is provided with a maximum of eight function producing cam surfaces.

* * * * *